United States Patent
Shen

(10) Patent No.: US 12,278,794 B2
(45) Date of Patent: Apr. 15, 2025

(54) METHOD FOR SEARCHING FOR CHAT INFORMATION AND ELECTRONIC DEVICE

(71) Applicant: VIVO MOBILE COMMUNICATION CO., LTD., Dongguan (CN)

(72) Inventor: Mingzhi Shen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/866,827

(22) Filed: Jul. 18, 2022

(65) Prior Publication Data

US 2022/0353225 A1 Nov. 3, 2022

Related U.S. Application Data

(63) Continuation of application No. PCT/CN2021/073177, filed on Jan. 22, 2021.

(30) Foreign Application Priority Data

Jan. 22, 2020 (CN) .......................... 202010074437.5

(51) Int. Cl.
*H04L 51/21* (2022.01)
*G06F 40/279* (2020.01)

(52) U.S. Cl.
CPC ............ *H04L 51/21* (2022.05); *G06F 40/279* (2020.01)

(58) Field of Classification Search
CPC ............................... H04L 51/21; G06F 40/279
USPC ......................................................... 709/206
See application file for complete search history.

(56) References Cited

U.S. PATENT DOCUMENTS

| 6,356,437 | B1 * | 3/2002 | Mitchell | G06F 1/163 |
| | | | | 361/730 |
| 6,574,672 | B1 * | 6/2003 | Mitchell | G06F 1/163 |
| | | | | 709/200 |
| 6,697,894 | B1 * | 2/2004 | Mitchell | G06F 1/163 |
| | | | | 361/679.55 |
| 10,057,202 | B2 * | 8/2018 | Liu | H04L 51/216 |
| 10,986,230 | B1 * | 4/2021 | Sethi | H04L 51/216 |
| 2009/0254529 | A1 * | 10/2009 | Goldentouch | G06F 16/9535 |

(Continued)

FOREIGN PATENT DOCUMENTS

| CN | 108075966 A | 5/2018 |
| CN | 108446345 A | 8/2018 |

(Continued)

OTHER PUBLICATIONS

International Search Report issued in corresponding International Application No. PCT/CN2021/073177, mailed Mar. 18, 2021, 4 pages.

(Continued)

*Primary Examiner* — Tauqir Hussain
(74) *Attorney, Agent, or Firm* — IPX PLLC

(57) ABSTRACT

A method for searching for chat information and an electronic device are provided. The method includes: receiving a first input performed by a user; and displaying N identifiers in response to the first input, where each identifier indicates at least one piece of chat information of an information type associated with a target chat object, and chat information indicated by the N identifiers is chat information associated with a keyword inputted by the first input; and N is a positive integer.

11 Claims, 11 Drawing Sheets

(56) References Cited

U.S. PATENT DOCUMENTS

| | | | | |
|---|---|---|---|---|
| 2009/0306981 A1* | 12/2009 | Cromack | ............. | G06F 16/685 |
| | | | | 707/E17.103 |
| 2017/0187658 A1* | 6/2017 | Ryu | ...................... | G06F 16/583 |
| 2018/0083792 A1* | 3/2018 | Wanderski | ............. | H04L 67/56 |
| 2019/0156177 A1 | 5/2019 | Abdallah et al. | | |
| 2020/0042526 A1* | 2/2020 | Yun | ......................... | G06F 16/48 |
| 2020/0137005 A1* | 4/2020 | Kim | ......................... | H04L 51/04 |
| 2020/0226481 A1* | 7/2020 | Sim | ......................... | G06F 21/34 |
| 2020/0302017 A1* | 9/2020 | Madavarapu | ........... | H04L 51/02 |
| 2020/0320168 A1* | 10/2020 | Shirbhate | ................ | H04L 51/42 |
| 2021/0097097 A1* | 4/2021 | Alkan | ................. | G06F 16/3329 |
| 2022/0261448 A1* | 8/2022 | Kamatani | ........... | G06F 16/3329 |

FOREIGN PATENT DOCUMENTS

| | | |
|---|---|---|
| CN | 109164949 A | 1/2019 |
| CN | 110046019 A | 7/2019 |
| CN | 110059241 A | 7/2019 |
| CN | 105812231 B | 11/2019 |
| CN | 111274416 A | 6/2020 |
| JP | 2006011064 A | 1/2006 |
| JP | 2015095257 A | 5/2015 |
| JP | 2016021178 A | 2/2016 |
| JP | 2017084366 A | 5/2017 |
| JP | 2018505484 A | 2/2018 |
| JP | 2019049970 A | 3/2019 |
| WO | 2016162842 A1 | 10/2016 |

OTHER PUBLICATIONS

Extended European Search Report issued in related European Application No. 21744506.3, mailed May 17, 2023, 10 pages.

First Office Action issued in related Chinese Application No. 202010074437.5, mailed Feb. 24, 2023, 11 pages.

Notice of Reasons for Refusal issued in related Japanese Application No. 2022-544415, mailed Oct. 3, 2023, 10 pages.

Second Office Action issued in related Chinese Application No. 202010074437.5, mailed Sep. 22, 2023, 9 pages.

Decision of Rejection issued in related related Chinese Application No. 202010074437.5, mailed Feb. 4, 2024, 5 pages.

Notice of Reasons for Refusal issued in related Japanese Application No. 2022-544415, mailed Mar. 26, 2024, 6 pages.

* cited by examiner

US 12,278,794 B2

METHOD FOR SEARCHING FOR CHAT INFORMATION AND ELECTRONIC DEVICE

CROSS-REFERENCE TO RELATED APPLICATIONS

This application is a continuation of International Application No. PCT/CN2021/073177, filed Jan. 22, 2021, which claims priority to Chinese Patent Application No. 202010074437.5, filed Jan. 22, 2020. The entire contents of each of the above-referenced applications are expressly incorporated herein by reference.

TECHNICAL FIELD

The present disclosure relates to the field of communication technologies, and in particular, to a method for searching for chat information and an electronic device.

BACKGROUND

With the development of technologies, increasingly rich content such as text, pictures, speech, videos, links, positioning, and animation is contained in network chatting, and rich chat content effectively improves the interestingness of chatting. However, when there is a large amount of chat content, and when a user wants to search for specific content, the user usually slides a historical chat record upward to search for previous chat content. If the specific content that the user wants to search for is a long time ago, it usually takes a long time. As can be seen, the search efficiency of existing chat content search is low.

SUMMARY

Embodiments of the present disclosure provide a method for searching for chat information and an electronic device.

According to a first aspect, an embodiment of the present disclosure provides a method for searching for chat information, including:
  receiving a first input performed by a user; and
  displaying N identifiers in response to the first input, where each identifier indicates at least one piece of chat information of an information type associated with a target chat object, and chat information indicated by the N identifiers is chat information associated with a keyword inputted by the first input; and N is a positive integer.

According to a second aspect, an embodiment of the present disclosure further provides an electronic device, including:
  a first receiving module, configured to receive a first input performed by a user; and
  a first display module, configured to display N identifiers in response to the first input, where each identifier indicates at least one piece of chat information of an information type associated with a target chat object, and chat information indicated by the N identifiers is chat information associated with a keyword inputted by the first input; and N is a positive integer.

According to a third aspect, an embodiment of the present disclosure provides an electronic device, including a processor, a memory, and a computer program stored on the memory and runnable on the processor, where the computer program, when executed by the processor, implements the steps of the method for searching for chat information.

According to a fourth aspect, an embodiment of the present disclosure further provides a computer-readable storage medium, storing a computer program, where the computer program, when executed by a processor, implements the steps of the method for searching for chat information.

According to a fifth aspect, an embodiment of the present disclosure further provides a computer program product, stored in a non-volatile storage medium, where the program product is configured to be executed by at least one processor to implement the steps of the method for searching for chat information.

In the embodiments of the present disclosure, a first input performed by a user is received, text-type chat information associated with a keyword inputted by the first input may be obtained, and picture information, video information, speech information, positioning information, and the like that are associated with the keyword may also be obtained. In addition, the found chat information is displayed in the form of an identifier, and each identifier is associated with chat information of an information type. Compared with an existing searching process, search operations may be effectively simplified, and chat information may further be quickly and conveniently searched for, thereby improving search efficiency.

DETAILED DESCRIPTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
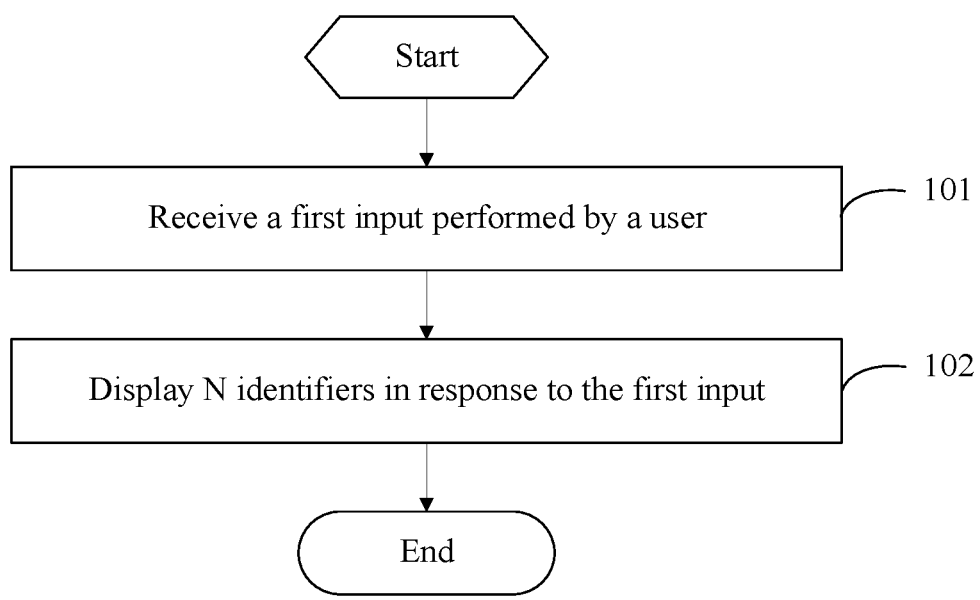
FIG. 1 is a flowchart of a method for searching for chat information according to an embodiment of the present disclosure.

FIG. 1 is a flowchart of a method for searching for chat information according to an embodiment of the present disclosure. The method for searching for chat information provided in this embodiment of the present disclosure is applied to an electronic device. As shown in FIG. 1, the method includes the following steps.

Step 101. Receive a first input performed by a user.

In the step, the first input may be a keyword inputted by the user on a historical chat record and is used for searching the historical chat record for chat information associated with the keyword.

The historical chat record may be a group historical chat record, or may be a private historical chat record, or even may be a historical chat record set of a plurality of chat objects selected by a user.

For example, if the user wants to search a historical chat record with "Xiao Ming" for chat information of "basketball", the user may input a keyword "basketball" in a search interface of the historical chat record with "Xiao Ming", to search the historical chat record with "Xiao Ming" for the chat information associated with "basketball".

Step 102. Display N identifiers in response to the first input.

In the step, N is a positive integer. Chat information indicated by the N identifiers may be chat information associated with the keyword inputted by the first input, and each identifier may indicate at least one piece of chat information of an information type associated with a target chat object. That is, each identifier is equivalent to a shortcut identifier of an information type. An identifier is clicked, and a display interface in which chat information associated with an information type corresponding to the identifier is located may be jumped to, so that the user views the chat information associated with the identifier in the chat information associated with the keyword inputted by the first input.

Th target chat object may be a group chat object or may be a private chat object.

In this implementation, the information type includes speech information, text information, picture information, video information, positioning information, and the like. Each information type corresponds to an identifier, and each identifier may indicate at least one piece of chat information of one information type.

Figure 2:
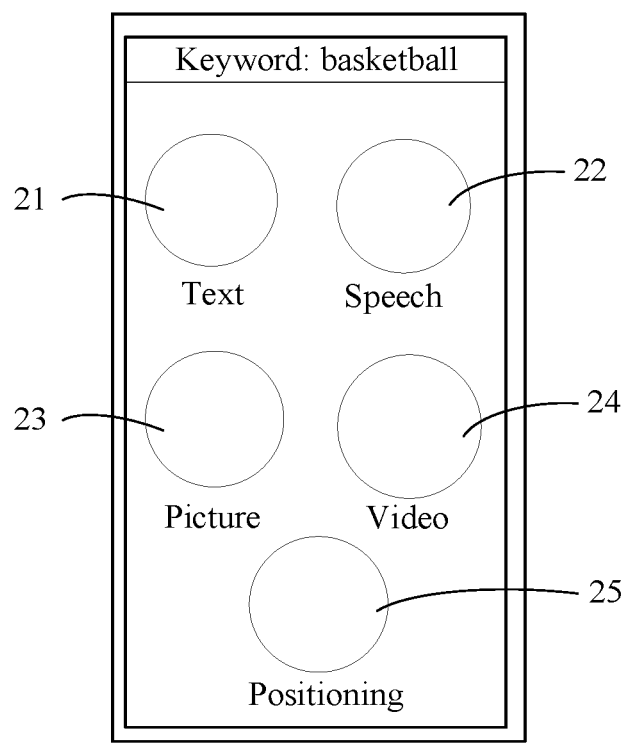
FIG. 2 is a first schematic diagram of display of a chat interface according to an embodiment of the present disclosure.

As shown in FIG. 2, in a case that an inputted keyword is "basketball", five identifiers are displayed, which are: a text identifier 21, a speech identifier 22, a picture identifier 23, a video identifier 24, and a positioning identifier 25. The five identifiers may be displayed in the form of a list; or a search interface may be divided into five regions for displaying each identifier. In addition, the identifier may be a circular control or icon, and a type of the identifier is annotated by using text below the identifier for the user to identify the information type.

It should be noted that, the display manner and form of the identifier include, but are not limited to, the manner, or may be set according to a preference of a user.

Therefore, a first input performed by a user is received, text-type chat information associated with a keyword inputted by the first input may be obtained, and picture information, video information, speech information, positioning information, and the like that are associated with the keyword may also be obtained. In addition, the found chat information is displayed in the form of an identifier, and each identifier is associated with chat information of an information type. Compared with an existing searching process, search operations may be effectively simplified, and chat information may further be quickly and conveniently searched for, thereby improving search efficiency.

For a historical chat record between the user and a target chat object, each piece of chat information in the historical chat record may be classified based on an information type, and each piece of chat information is collected into a corresponding database, so that in an information search process, a corresponding database may be directly searched by using a keyword, to improve search efficiency for chat information associated with the keyword. In addition, the user can quickly search for a required information type, to improve the search efficiency for the chat information.

For example, a text-type chat information database, a speech-type chat information database, a picture-type chat information database, a video-type chat information database, and a positioning-type chat information database may be pre-established. In this way, in a chat information search process, each database may be searched by using a keyword for associated chat information, and the found chat information is classified based on a type of the database.

If text-type chat information associated with the keyword is searched for, the found text-type chat information is classified into an information type corresponding to a text identifier, and an input performed by a user on the identifier is received, to jump to an interface of the text-type chat information associated with the keyword and included in the information type corresponding to the text identifier.

If speech-type chat information associated with the keyword is searched for, the found speech-type chat information is classified into an information type corresponding to a speech identifier, and an input performed by the user on the identifier is received, to jump to an interface of the speech-type chat information associated with the keyword and included in the information type corresponding to the speech identifier. When the speech-type chat information associated with the keyword is obtained, the speech-type chat information may be recognized, and it is determined whether content obtained through recognition and parsing is associated with the keyword. If the content is associated with the keyword, corresponding speech-type chat information is determined as the speech-type chat information associated with the keyword.

If picture-type chat information or video-type chat information associated with the keyword is searched for, the found picture-type chat information is classified into an information type corresponding to a picture identifier and the found video-type chat information is classified into an information type corresponding to a video identifier. If an input for the picture identifier is received, an interface of the picture-type chat information associated with the keyword and included in the information type corresponding to the picture identifier is jumped to. If an input for the video identifier is received, an interface of the video-type chat information associated with the keyword and included in the information type corresponding to the picture identifier is jumped to. The picture-type chat information or the video-type chat information may be parsed, and it is determined whether content obtained through parsing is associated with the keyword. If the content is associated with the keyword, corresponding picture-type chat information or video-type chat information is determined as the picture-type chat information or the video-type chat information associated with the keyword.

If positioning-type chat information associated with the keyword is searched for, the found positioning-type chat information is classified into an information type corresponding to a positioning identifier, and an input performed by the user on the identifier is received, to jump to an interface of the positioning-type chat information associated with the keyword and included in the information type corresponding to the positioning identifier.

For example, for picture information in a historical chat record between the user and a target chat object, all pictures in the historical chat record may be collected into the picture-type chat information database. In this way, when a picture in the historical chat record is recognized and parsed, the picture may be directly invoked from the picture-type chat information database without first selecting the picture from the historical chat record and then recognizing and parsing the selected picture, thereby improving the search efficiency.

In addition, the pictures in the picture-type chat information database may further be classified into, for example, landscape-type pictures, person-type pictures, and motion-type pictures. During searching, a corresponding subdivision category may be searched according to a category of a keyword, to further improve the search efficiency of the chat information associated with the keyword. For example, if a keyword is "basketball", the motion-type pictures may be searched for a picture associated with "basketball", to improve the search efficiency of the chat information.

In some embodiments, after the displaying N identifiers, the method further includes: receiving a second input performed by the user on a first identifier in the N identifiers; and displaying M pieces of chat information corresponding to an information type of the first identifier in response to the second input, where M is a positive integer.

In this implementation, the second input may be a press operation or a selection operation for the first identifier. The M pieces of chat information corresponding to the information type of the first identifier are displayed in response to the second input. In this way, the user may conveniently view chat information of different information types associated with the keyword, to improve the search efficiency of the user.

Figure 3:
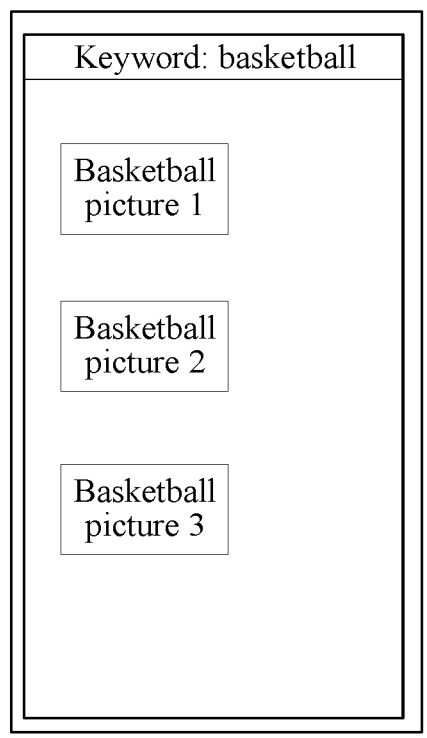
FIG. 3 is a second schematic diagram of display of a chat interface according to an embodiment of the present disclosure.

For example, if a click operation by the user on a picture identifier 23 in FIG. 2 is received, picture-type chat information associated with the picture identifier 23 is jumped to and displayed, as shown in FIG. 3. Pictures shown in FIG. 3 may be displayed in the form of a list, or may be displayed in the form of a thumbnail, or may be displayed in the form of a 3-by-3 grid or a gallery.

In some embodiments, after the displaying M pieces of chat information corresponding to an information type of the first identifier, the method further includes: receiving a third input performed by the user on first target chat information in the M pieces of chat information; and jumping to a target chat interface in which the first target chat information is located in response to the third input, where the target chat interface includes the first target chat information.

In this implementation, the third input may be a selection operation or a press operation for a first target chat information in the M pieces of chat information, to select the first target chat information from the M pieces of chat information, and jump to the target chat interface in which the first target chat information is located. The target chat interface is a position at which the first target chat information is recorded in the historical chat record between the user and the target chat object. In this way, the user may conveniently view chat information associated with the first target chat information, to help the user to memorize an event related to the first target chat information, thereby improving a search effect for the chat information.

When the first target chat information is picture-type chat information or video-type chat information, and a quantity of pictures or videos is greater than a preset value, for example, five, the pictures or the videos in the first target chat information may be displayed according to a second preset mode such as a thumbnail mode, a 3-by-3 grid mode, or a gallery mode, to reduce a display region occupied by the first target chat information in the target chat interface, thereby improving a view effect of the user for the chat information.

Figure 4:
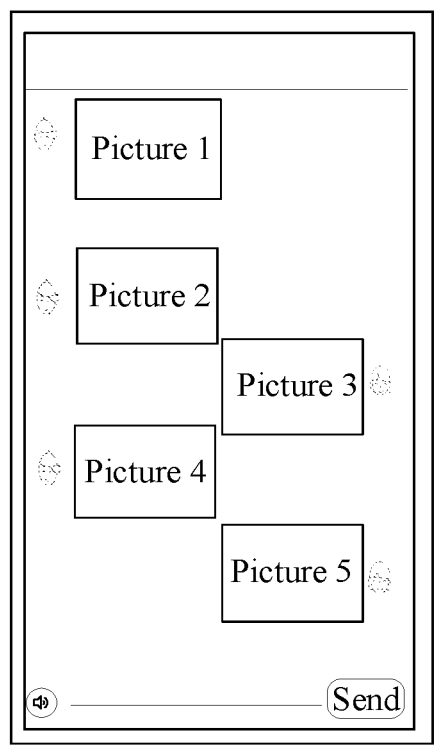
FIG. 4 is a third schematic diagram of display of a chat interface according to an embodiment of the present disclosure.
Figure 5:
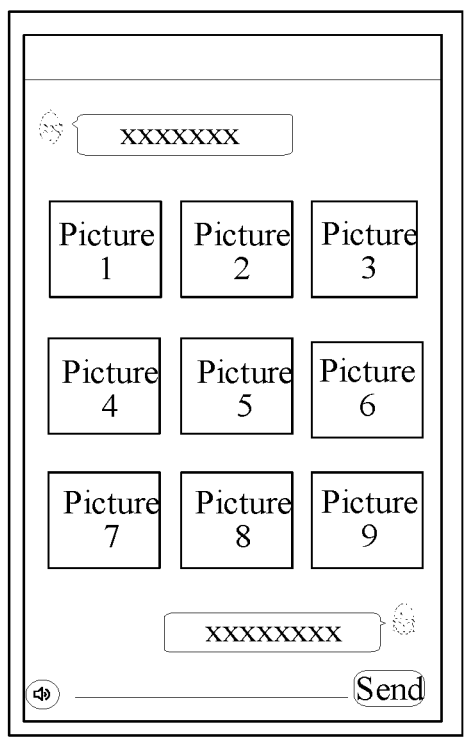
FIG. 5 is a fourth schematic diagram of display of a chat interface according to an embodiment of the present disclosure.
Figure 6:
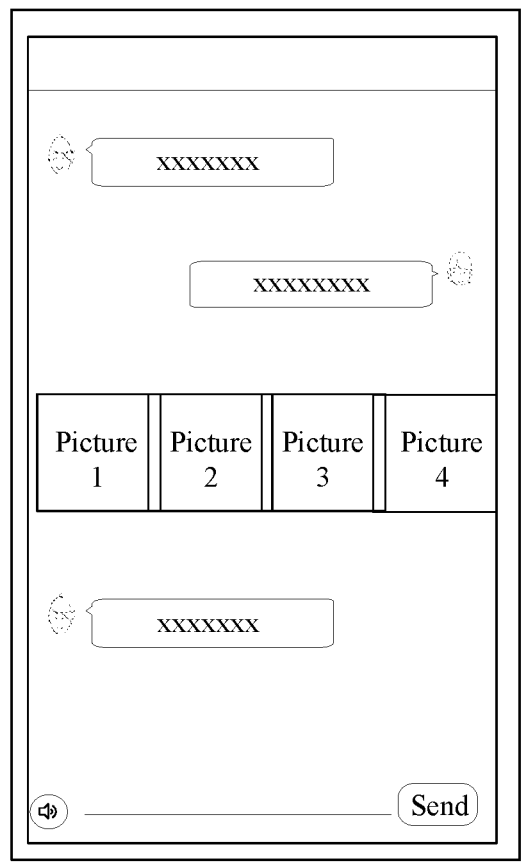
FIG. 6 is a fifth schematic diagram of display of a chat interface according to an embodiment of the present disclosure.

For example, when a quantity of pictures in the first target chat information is relatively large, especially a quantity of continuous pictures is relatively large, for example, a quantity of pictures continuously sent by a user A exceeds 10, the 10 pictures continuously sent by the user A may be displayed according to a preset mode. For example, the 10 pictures are displayed in the form of an album, or the 10 pictures are displayed in the form of a gallery, or the 10 pictures are displayed in the form of a grid for the user to view, which is shown in FIG. 4, FIG. 5, and FIG. 6. FIG. 4 is a conventional display mode, FIG. 5 is displaying in the form of the grid, and FIG. 6 is displaying in the form of the gallery.

In addition, pictures that have been organized in the form of a gallery or a grid are processed in batches. For example, a grid or a gallery is selected and then shared to a friend or a group chat, to simplify sharing operations by the user; or after a grid or a gallery is selected, a picture corresponding to the grid or gallery is stored in a picture library, to simplify storage operations performed by the user.

In some embodiments, after the jumping to a target chat interface in which the first target chat information is located, the method further includes: displaying, in a case that the target chat interface further includes T pieces of chat information corresponding to an information type of a second identifier, the T pieces of chat information according to a first preset mode, where the second identifier is any identifier other than the first identifier in the N identifiers, T is a positive integer, and the first preset mode includes at least one of a hiding mode or a thumbnail mode.

In this implementation, if T pieces of chat information other than the first target chat information are displayed in the target chat interface, the T pieces of chat information may be displayed according to a first preset mode such as a hiding mode or a thumbnail mode, to avoid interference to content of the first target chat information by unnecessary chat information, thereby improving user experience.

For example, text/speech/positioning-type chat information in the T pieces of chat information may be displayed in the form of an ellipsis; and image/video-type chat information in the T pieces of chat information may be displayed in the form of a thumbnail.

In some embodiments, in a case that the T pieces of chat information include second target chat information associated with the keyword, an information label is displayed in a target region associated with the second target chat information. The target region may be a side of the second target chat information or may be displayed in a display region in which the second target chat information is located in a suspension manner. The information label may indicate at least one piece of information of which a degree of association with the keyword in the second target chat information is greater than a preset degree of association. Therefore, the user may further view chat information of another information type associated with the keyword in the target chat interface, to improve the view efficiency of the user for the chat information.

In some embodiments, after displaying an information label in a target region associated with the second target chat information, the method further includes: receiving a fourth input performed by the user on the information label; and jumping, in response to the fourth input, to a chat interface in which S pieces of chat information corresponding to the information type of the second identifier are displayed, where S is a positive integer.

In this implementation, the fourth input may be a click operation or a press operation for the information label. The user triggers to jump to the chat interface in which the S pieces of chat information corresponding to the information type of the second identifier are displayed. In this way, a chat interface of an information type may be jumped to a chat interface of another information type, and the user may view chat information of another information type without returning to an identifier display interface in FIG. 2, to simplify viewing operations by the user on the chat information, thereby improving the view efficiency of the chat information.

Figure 7:
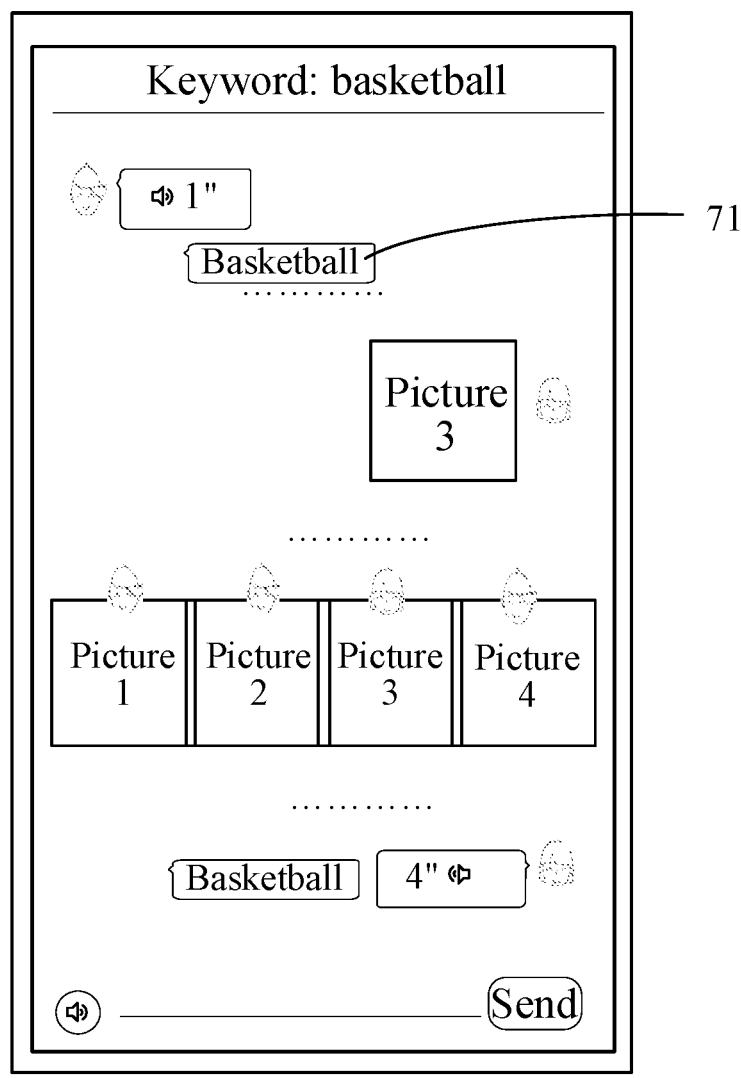
FIG. 7 is a sixth schematic diagram of display of a chat interface according to an embodiment of the present disclosure.

As shown in FIG. 7, if content associated with a keyword "basketball" exists in hidden chat information, an information label 71 is displayed in a target region of the chat information. The information label 71 may be displayed above the chat information in the form of a floating window. In addition, when a fourth input on the information label is received, a chat interface in which S pieces of chat information corresponding to the information type of the second identifier are displayed is jumped to.

Figure 8:
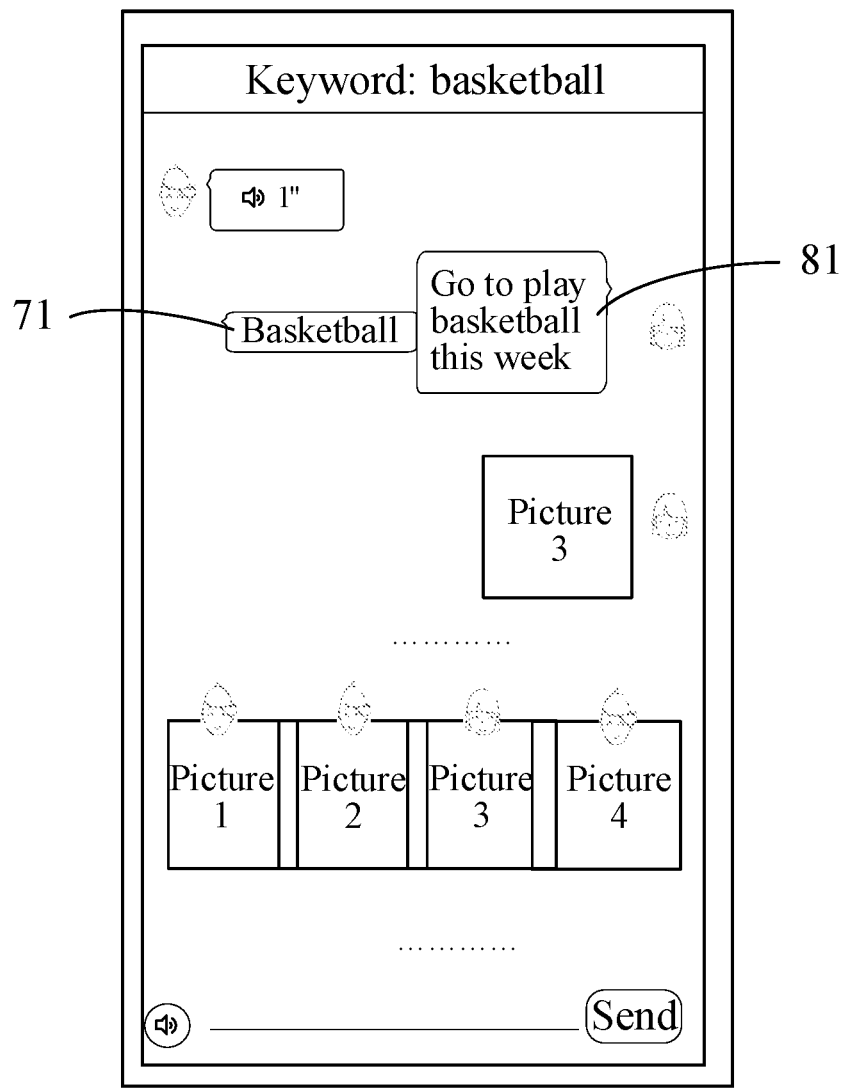
FIG. 8 is a seventh schematic diagram of display of a chat interface according to an embodiment of the present disclosure.

As shown in FIG. 8, if a click operation for the information label 71 in FIG. 7 is received, a floating window 81 including chat content associated with the information label may further be displayed near the information label 71, so that the user conveniently views key information of the chat information, to improve the view effect of the chat information.

For chat information expressing emotion in chat information of another type, information associated with emotion may be extracted, and the information associated with the emotion is displayed above or near the chat information in a suspension manner, so that when viewing corresponding chat information, the user may further view emotional change during chatting, to effectively improve view experience of the user.

To distinguish a picture sent by a friend from a picture sent by the user, special processing may further be performed on the picture. For example, a side frame of the picture sent by the user may be displayed as red, and a side frame of the picture sent by the friend is displayed as blue; or the picture is marked, to distinguish the picture sent by the user from the picture sent by the friend.

Similarly, whether chat information of another type such as video-type chat information or positioning-type chat information is sent by the user or the friend may also be distinguished in the same manner. If the target chat object is a chat group, senders may be sorted into a user and other people in the chat group; or a quantity of people in the chat group is first obtained, and a distinguishing manner is determined based on the quantity of people. If the quantity of people in the chat group is less than a preset quantity of people, for example, five, information sent by each chat object is marked. If the quantity of people in the chat group is equal to or greater than the preset quantity of people, for example, seven, the senders are sorted into the user and other people in the chat group, to reduce a calculation amount of the electronic device.

In some embodiments, the displaying M pieces of chat information corresponding to an information type of the first identifier includes: displaying the M pieces of chat information corresponding to the information type of the first identifier and topic information associated with the keyword.

In this implementation, when the M pieces of chat information are displayed, both the M pieces of chat information and topic information associated with the keyword may be displayed, to enrich display content in the chat interface. The topic information associated with the keyword is displayed, so that the user may conveniently view the topic information associated with the keyword, to improve the view effect of the chat information and help the user to memorize content of a related topic.

The topic information may be conference information, ticket information, or the like, and a type thereof has a specific association relationship with the keyword. For example, the keyword is "basketball", the topic information may be professional basketball, basketball league, basketball community, or the like, so that the user views related information, to improve the view effect of the chat information.

Figure 9:
FIG. 9 is an eighth schematic diagram of display of a chat interface according to an embodiment of the present disclosure.

As shown in FIG. 9, the M pieces of chat information and the topic information associated with the keyword may be displayed according to a time sequence. For example, a date is displayed in the front, and the topic information or the keyword inputted by the first input is displayed behind the date.

Figure 10:
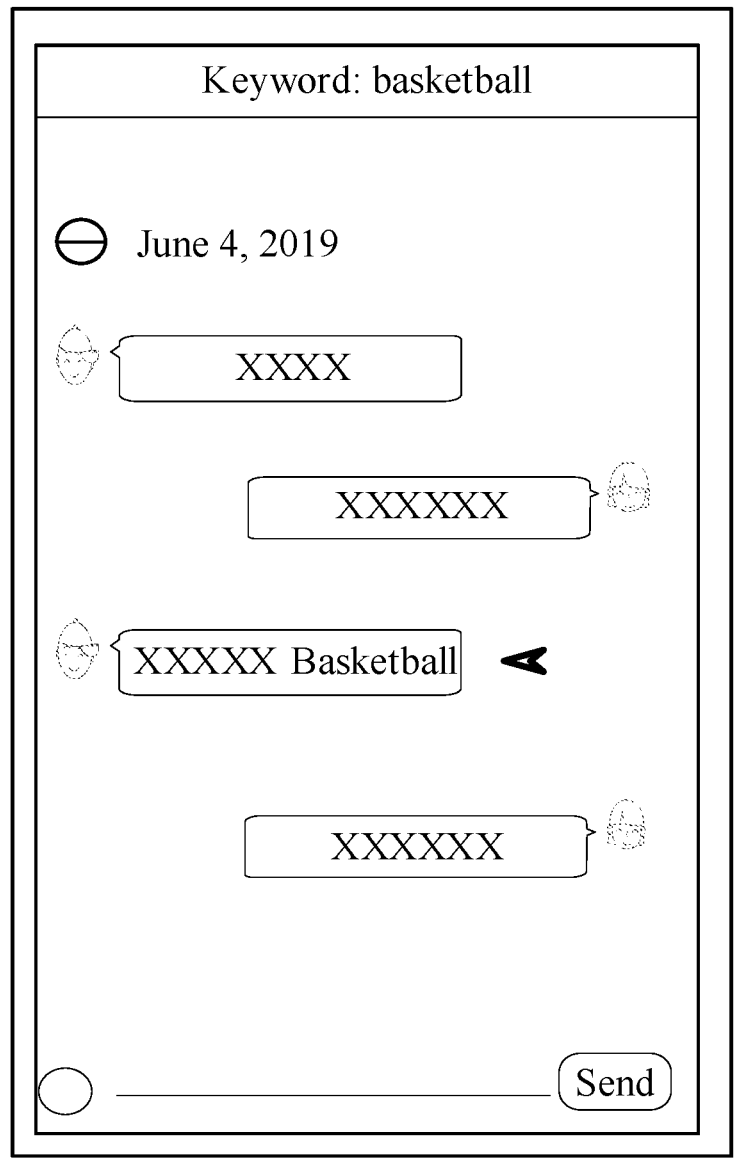
FIG. 10 is a ninth schematic diagram of display of a chat interface according to an embodiment of the present disclosure.

If a click operation for topic information or a keyword behind a date is received, a current interface has an automatic page-flip effect, and specific chat information or specific content associated a corresponding topic is displayed, which is shown in FIG. 10. If a topic is positioning information, a positioning identifier is clicked, and a map application may be directly jumped to and positioning is performed.

When the historical chat record between the user and the target chat object is searched by using the keyword for the chat information, blur processing may further be performed on the keyword. For example, if the keyword is "basketball", "ball" may also be used as a keyword for searching, to improve accuracy of searching. For example, a user A loves playing basketball, but the user A is used to say "go playing ball" during usual chatting, and "playing ball" herein refers to "playing basketball". If in a searching process, only "basketball" is used as a keyword for searching, much chat information associated with basketball is missed. Therefore, blur processing is performed on the keyword "basketball", and "ball" is also used as a keyword, to improve the accuracy of searching.

According to the method for searching for chat information in this embodiment of the present disclosure, a first input performed by a user is received; and N identifiers are displayed in response to the first input, where each identifier indicates at least one piece of chat information of an information type associated with a target chat object, and chat information indicated by the N identifiers is chat information associated with a keyword inputted by the first input; and N is a positive integer. In this way, search operations may be effectively simplified, and chat information may further be quickly and conveniently searched for, thereby improving search efficiency.

Figure 11:
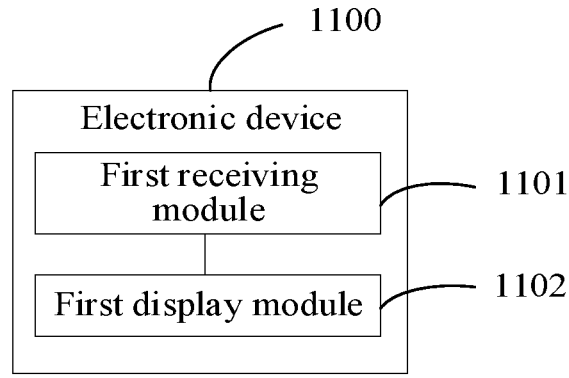
FIG. 11 is a structural diagram of an electronic device according to an embodiment of the present disclosure.

FIG. 11 is a structural diagram of an electronic device according to an embodiment of the present disclosure. As shown in FIG. 11, the electronic device 1100 includes:
- a first receiving module 1101, configured to receive a first input performed by a user; and
- a first display module 1102, configured to display N identifiers in response to the first input, where
- each identifier indicates at least one piece of chat information of an information type associated with a target chat object, and chat information indicated by the N identifiers is chat information associated with a keyword inputted by the first input; and N is a positive integer.

In some embodiments, the electronic device 1100 further includes:
- a second receiving module, configured to receive a second input performed by the user on a first identifier in the N identifiers; and
- a second display module, configured to display M pieces of chat information corresponding to an information type of the first identifier in response to the second input, where
- M is a positive integer.

In some embodiments, the electronic device 1100 further includes:
- a third receiving module, configured to receive a third input performed by the user on first target chat information in the M pieces of chat information; and
- a first jump module, configured to jump to a target chat interface in which the first target chat information is located in response to the third input, where the target chat interface includes the first target chat information.

In some embodiments, the electronic device 1100 further includes:
- a third display module, configured to display, in a case that the target chat interface further includes T pieces of chat information corresponding to an information type of a second identifier, the T pieces of chat information according to a first preset mode, where
- the second identifier is any identifier other than the first identifier in the N identifiers, T is a positive integer, and the first preset mode includes at least one of a hiding mode or a thumbnail mode.

In some embodiments, the third display module is further configured to display, in a case that the T pieces of chat information include second target chat information associated with the keyword, an information label in a target region associated with the second target chat information, where
- the information label indicates at least one piece of information of which a degree of association with the keyword in the second target chat information is greater than a preset degree of association.

In some embodiments, the electronic device 1100 further includes:
- a fourth receiving module, configured to receive a fourth input performed by the user on the information label; and
- a second jump module, configured to jump, in response to the fourth input, to a chat interface in which S pieces of chat information corresponding to the information type of the second identifier are displayed, where
- S is a positive integer.

In some embodiments, the first target chat information includes image information, and the image information includes at least one of picture information or video information.

The electronic device 1100 further includes:
- a fourth display module, configured to display the image information in the first target chat information according to a second preset mode in a case that a quantity of images in the first target chat information is greater than a preset value, where
- the second preset mode includes at least one of a thumbnail mode, a grid mode, or a gallery mode.

The second display module is further configured to display the M pieces of chat information corresponding to the information type of the first identifier and topic information associated with the keyword.

The electronic device 1100 can implement the processes implemented by the electronic device in the method embodiments of FIG. 1 to FIG. 10. To avoid repetition, details are not described herein again.

Figure 12:
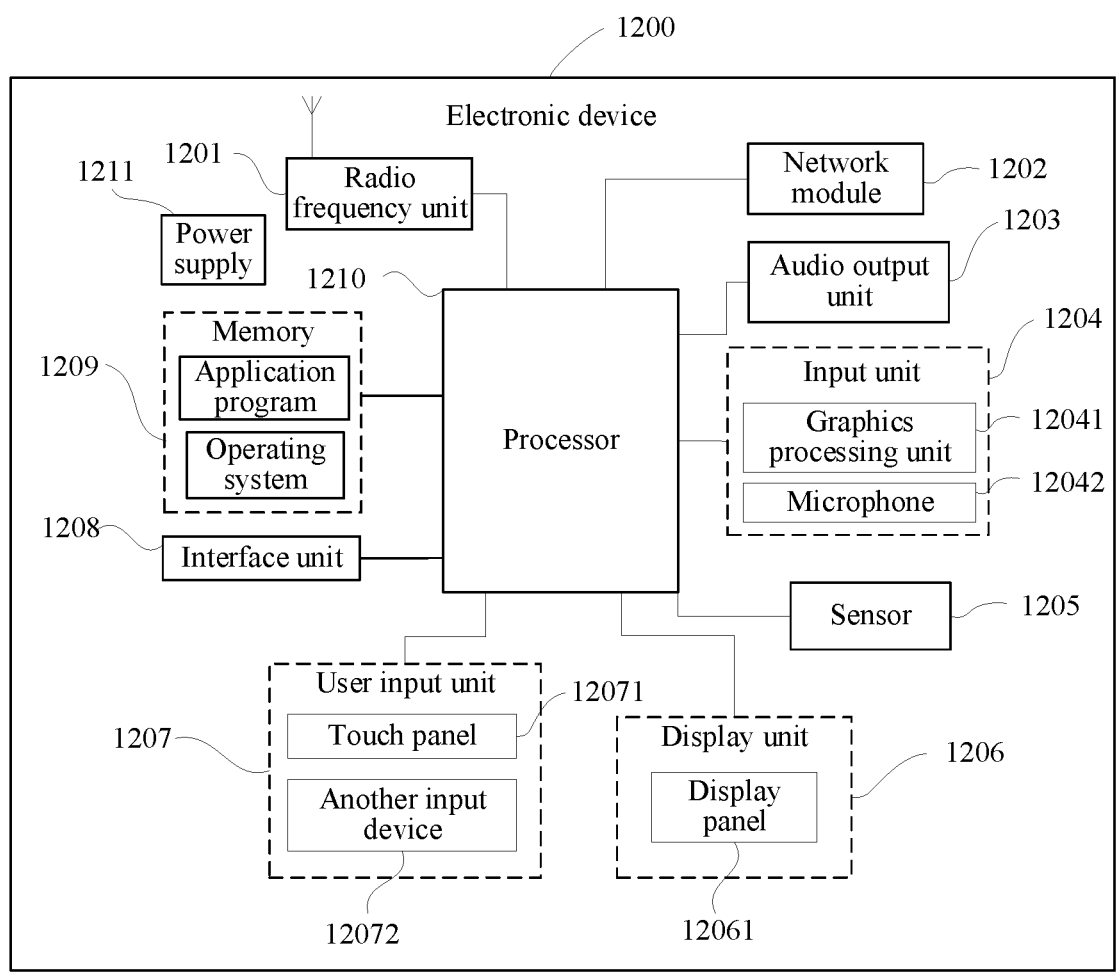
FIG. 12 is a structural diagram of an electronic device according to another embodiment of the present disclosure.

FIG. 12 is a schematic structural diagram of hardware of an electronic device according to the embodiments of the present disclosure. As shown in FIG. 12, the electronic device 1200 includes, but is not limited to, components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the electronic device structure shown in FIG. 12 does not constitute a limitation to the electronic device. The electronic device may include more or fewer components than those shown in the figure, or some components may be combined, or a different component deployment may be used. In the embodiments of the present disclosure, the electronic device includes but is not limited to a mobile phone, a tablet computer, a notebook computer, a handheld computer, an in-vehicle terminal, a wearable device, and a pedometer.

The user input unit 1207 is configured to receive a first input performed by a user. The display unit 1206 is configured to display N identifiers in response to the first input, where each identifier indicates at least one piece of chat information of an information type associated with a target chat object, and chat information indicated by the N identifiers is chat information associated with a keyword inputted by the first input; and N is a positive integer.

In some embodiments, the user input unit 1207 is configured to receive a second input performed by the user on a first identifier in the N identifiers. The display unit 1206 is configured to display M pieces of chat information corresponding to an information type of the first identifier in response to the second input, where M is a positive integer.

In some embodiments, the user input unit 1207 is configured to receive a third input performed by the user on first target chat information in the M pieces of chat information. The processor 1210 is configured to jump to a target chat interface in which the first target chat information is located in response to the third input, where the target chat interface includes the first target chat information.

In some embodiments, the display unit 1206 is configured to display, in a case that the target chat interface further includes T pieces of chat information corresponding to an information type of a second identifier, the T pieces of chat information according to a first preset mode, where the second identifier is any identifier other than the first identifier in the N identifiers, T is a positive integer, and the first preset mode includes at least one of a hiding mode or a thumbnail mode.

In some embodiments, the display unit 1206 is configured to display, in a case that the T pieces of chat information include second target chat information associated with the keyword, an information label in a target region associated with the second target chat information, where the information label indicates at least one piece of information of which a degree of association with the keyword in the second target chat information is greater than a preset degree of association.

In some embodiments, the user input unit 1207 is configured to receive a fourth input performed by the user on the information label. The processor 1210 is configured to jump, in response to the fourth input, to a chat interface in which S pieces of chat information corresponding to the information type of the second identifier are displayed, where S is a positive integer.

In some embodiments, the first target chat information includes image information, and the image information includes at least one of picture information or video information. The display unit 1206 is configured to display the image information in the first target chat information according to a second preset mode in a case that a quantity of images in the first target chat information is greater than a preset value, where the second preset mode includes at least one of a thumbnail mode, a grid mode, or a gallery mode.

In some embodiments, the display unit 1206 is configured to display the M pieces of chat information corresponding to the information type of the first identifier and topic information associated with the keyword.

The electronic device 1200 can implement various processes implemented by the electronic device in the foregoing embodiments. To avoid repetition, details are not described herein again.

It should be understood that in the embodiments of the present disclosure, the radio frequency unit 1201 may be configured to send and receive a signal during an information receiving and sending process or a call process. After downlink data from a base station is received, the downlink data is sent to the processor 1210 for processing. In addition, uplink data is sent to the base station. Generally, the radio frequency unit 1201 includes, but is not limited to, an antenna, at least one amplifier, a transceiver, a coupler, a low noise amplifier, a duplexer, and the like. In addition, the radio frequency unit 1201 may further communicate with the network and another device through wireless communication system.

The electronic device provides the user with wireless broadband Internet access in the network module 1202, such as helping the user to send and receive emails, browse web pages, and access streaming media.

The audio output unit 1203 may convert audio data received by the radio frequency unit 1201 or the network module 1202 or stored in the memory 1209 into an audio signal and output the audio signal as sound. In addition, the audio output unit 1203 may further provide an audio output that is related to a particular function executed by the electronic device 1200 (for example, a call signal receiving sound or a message receiving sound). The audio output unit 1203 includes a loudspeaker, a buzzer, a receiver, and the like.

The input unit 1204 is configured to receive an audio or video signal. The input unit 1204 may include a Graphics Processing Unit (GPU) 12041 and a microphone 12042. The graphics processing unit 12041 performs processing on image data of a static picture or a video that is obtained by an image acquisition device (for example, a camera) in a video acquisition mode or an image acquisition mode. The processed image frame can be displayed on the display unit 1206. An image frame that has been processed by the graphics processing unit 12041 may be stored in the memory 1209 (or another storage medium) or sent by using the radio frequency unit 1201 or the network module 1202. The microphone 12042 may receive a sound, and can process the sound into audio data. The processed audio data may be transferred, in a phone talk mode, to a format that may be sent to a mobile communication base station via the radio frequency unit 1201 to output.

The electronic device 1200 may further include at least one sensor 1205, such as an optical sensor, a motion sensor, and other sensors. The optical sensor may include an ambient light sensor and a proximity sensor. The ambient light sensor may adjust luminance of the display panel 12061 according to brightness of the ambient light. The proximity sensor may switch off the display panel 12061 and/or backlight when the electronic device 1200 is moved to the ear. As one type of motion sensor, an acceleration sensor may detect magnitude of accelerations in various directions (which generally are triaxial), may detect magnitude and a direction of the gravity when static, and may be configured to identify an electronic device attitude (such as switchover between horizontal and vertical screens, a related game, and attitude calibration of a magnetometer), a related function of vibration identification (such as a pedometer and a knock); The sensor 1205 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 1206 is configured to display information input by the user or information provided for the user. The display unit 1206 may include a display panel 12061. The display panel 12061 may be configured by using a liquid crystal display (LCD), an organic light-emitting diode (OLED), or the like.

The user input unit 1207 may be configured to receive input digit or character information, and generate key signal input related to the user setting and function control of the electronic device. The user input unit 1207 may include a touch panel 12071 and another input device 12072. The touch panel 12071, also referred to as a touchscreen, may collect a touch operation of a user on or near the touch panel 12071 (such as an operation of a user on or near the touch panel 12071 by using any suitable object or attachment, such as a finger or a touch pen). The touch panel 12071 may include two parts: a touch detection apparatus and a touch controller. The touch detection apparatus detects a touch orientation of the user, detects a signal brought by the touch operation, and transmits the signal to the touch controller. The touch controller receives the touch information from the touch detection apparatus, converts the touch information into touch point coordinates, and transmits the touch point coordinates to the processor 1210. Moreover, the touch controller may receive and execute a command transmitted from the processor 1210. In addition, the touch panel 12071 may be implemented by using various types, such as a resistive type, a capacitive type, an infrared type, and a surface acoustic wave type. In addition to the touch panel 12071, the user input unit 1207 may further include the another input device 12072. The another input device 12072 may include, but not limited to, a physical keyboard, a functional key (such as a volume control key or a switch key), a track ball, a mouse, and a joystick, which are not described herein in detail.

Further, the touch panel 12071 may cover the display panel 12061. After detecting a touch operation on or near the touch panel 12071, the touch panel transfers the touch operation to the processor 1210, so as to determine a type of the touch event. Then, the processor 1210 provides corresponding visual output on the display panel 12061 according to the type of the touch event. In FIG. 12, the touch panel 12071 and the display panel 12061 implement, as two independent parts, input and output functions of the electronic device. However, in some embodiments, the touch panel 12071 and the display panel 12061 may be integrated to implement the input and output functions of the electronic device, which is not specifically limited herein.

The interface unit 1208 is an interface for connecting an external apparatus to the electronic device 1200. For example, the external apparatus may include a wired or wireless headset port, an external power supply (or battery charger) port, a wired or wireless data port, a memory card port, a port for connecting an apparatus with a recognition module, an audio input/output (Input/Output, I/O) port, a video I/O port, a headphone port, and the like. The interface unit 1208 may be configured to receive an input (for example, data information or power) from the external apparatus, and transmit the received input to one or more elements in the electronic device 1200, or may be configured to transmit data between the electronic device 1200 and the external apparatus.

The memory 1209 may be configured to store a software program and various data. The memory 1209 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 1209 may include a high speed random access memory, and may further include a non-volatile memory, such as at least one magnetic disk storage device, a flash memory device or other non-volatile solid state storage devices.

The processor 1210 is a control center of the electronic device, and connects various parts of the entire electronic device by using various interfaces and lines. By running or executing a software program and/or a module stored in the memory 1209, and invoking data stored in the memory 1209, the processor performs various functions of the electronic device and processes data, thereby performing overall monitoring on the electronic device. The processor 1210 may include one or more processing units. The processor 1210 may integrate an application processor and a modem processor. The application processor mainly processes an operating system, a user interface, an application program, and the like. The modem processor mainly processes wireless communication. It may be understood that the foregoing modem processor may either not be integrated into the processor 1210.

The electronic device 1200 may further include a power supply 1211 (for example, a battery) for supplying power to the components. The power supply 1211 may be logically connected to the processor 1210 by using a power management system, thereby implementing functions such as charging, discharging, and power consumption management by using the power management system.

In addition, the electronic device 1200 includes some unshown functional modules, which is not repeated herein.

An embodiment of the present disclosure further provides an electronic device, including a processor 1210, a memory 1209, and a computer program stored on the memory 1209 and executable on the processor 1210, where the computer program, when executed by the processor 1210, implements the processes of the embodiment of the method for searching for chat information, and can achieve the same technical effects. To avoid repetition, details are not described herein again.

An embodiment of the present disclosure further provides a computer-readable storage medium, storing a computer program, where the computer program, when executed by a processor, implements the processes of the embodiment of the method for searching for chat information, and can achieve the same technical effects. To avoid repetition, details are not described herein again. The computer-readable storage medium may include a flash drive, a Read-Only Memory (ROM), a Random Access Memory (RAM), a magnetic disk, or an optical disc.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that for convenience and conciseness of description, for specific working processes of the foregoing described system, apparatus, and unit, refer to the corresponding processes in the foregoing method embodiments, and details are not described herein.

In the embodiments provided in this application, it should be understood that the disclosed apparatus and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the methods in the foregoing embodiments may be implemented by means of software and a necessary general hardware platform, and may also be implemented by hardware. The computer software product is stored in a storage medium (for example, a ROM/RAM, a magnetic disk, or an optical disc) including several instructions to enable a terminal device (which may be a mobile phone, a computer, a server, a network device, or the like) to perform the methods described in the embodiments of the present disclosure.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a Read-Only Memory (ROM), a Random Access Memory (RAM), or the like.

It may be understood that, the embodiments described in the embodiments of the present disclosure may be implemented by using software, hardware, firmware, middleware, microcode, or a combination thereof. For hardware implementation, modules, units, and subunits may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general-purpose processor, a controller, a micro-controller, a microprocessor, and other electronic units configured to execute the functions in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented inside or outside the processor.

The embodiments of the present disclosure are described above with reference to the accompanying drawings. However, the present disclosure is not limited to the foregoing implementations. The foregoing implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A method for searching for chat information, comprising:
    receiving a first input comprising a keyword inputted by a user to search for chat information associated with the keyword, wherein the chat information associated with the keyword fall under N different information types;
    displaying N identifiers indicating the N different information types of the chat information associated with the keyword in response to the first input without displaying the chat information, wherein each identifier comprises a user-selectable icon annotated with the corresponding information type, wherein N is a positive integer, and the N information types comprise a picture information type and a video information type;
    in response to receiving a second input selecting a first identifier among the N identifiers from the user, displaying M pieces of the chat information that is of the information type indicated by the first identifier, M being a positive integer;
    receiving a third input performed by the user on first target chat information in the M pieces of chat information;
    jumping to a target chat interface in which the first target chat information is located in response to the third input, wherein the target chat interface comprises the first target chat information; and
    displaying, when the target chat interface further comprises T pieces of chat information corresponding to an information type of a second identifier, the T pieces of chat information according to a first preset mode,
    wherein the second identifier is any identifier other than the first identifier in the N identifiers, T is a positive integer, and the first preset mode comprises at least one of a hiding mode or a thumbnail mode.

2. The method according to claim 1, wherein the displaying the T pieces of chat information according to a first preset mode comprises:
    displaying, when the T pieces of chat information comprise second target chat information associated with the keyword, an information label in a target region associated with the second target chat information,
    wherein the information label indicates that at least one piece of information is associated with the keyword in the second target chat information.

3. The method according to claim 2, wherein after the displaying an information label in a target region associated with the second target chat information, the method further comprises:
    receiving a fourth input performed by the user on the information label; and
    jumping, in response to the fourth input, to a chat interface in which S pieces of chat information corresponding to the information type of the second identifier are displayed,
    wherein S is a positive integer.

4. The method according to claim 1, wherein the first target chat information comprises image information, and the image information comprises at least one of picture information or video information; and
    after the jumping to a target chat interface in which the first target chat information is located, the method further comprises:
        displaying the image information in the first target chat information according to a second preset mode in a case that a quantity of images in the first target chat information is greater than a preset value,
        wherein the second preset mode comprises at least one of a thumbnail mode, a grid mode, or a gallery mode.

5. The method according to claim 1, wherein the displaying M pieces of the chat information that is of the information type indicated by the first identifier comprises:
    displaying the M pieces of chat information corresponding to the information type of the first identifier and topic information associated with the keyword.

6. An electronic device, comprising a memory storing a computer program; and a processor coupled to the memory and configured to execute the computer program to perform a method for searching for chat information, the method comprising:
- receiving a first input comprising a keyword inputted by a user to search for chat information associated with the keyword, wherein the chat information associated with the keyword fall under N different information types;
- displaying N identifiers indicating the N different information types of the chat information associated with the keyword in response to the first input without displaying the chat information wherein each identifier comprises a user-selectable icon annotated with the corresponding information type, wherein N is a positive integer, and the N information types comprise a picture information type and a video information type;
- in response to receiving a second input selecting a first identifier among the N identifiers from the user, displaying M pieces of the chat information that is of the information type indicated by the first identifier, M being a positive integer;
- receiving a third input performed by the user on first target chat information in the M pieces of chat information;
- jumping to a target chat interface in which the first target chat information is located in response to the third input, wherein the target chat interface comprises the first target chat information; and
- displaying, when the target chat interface further comprises T pieces of chat information corresponding to an information type of a second identifier, the T pieces of chat information according to a first preset mode,
- wherein the second identifier is any identifier other than the first identifier in the N identifiers, T is a positive integer, and the first preset mode comprises at least one of a hiding mode or a thumbnail mode.

7. The electronic device according to claim 6, wherein the displaying the T pieces of chat information according to a first preset mode comprises:
- displaying, when the T pieces of chat information comprise second target chat information associated with the keyword, an information label in a target region associated with the second target chat information,
- wherein the information label indicates that at least one piece of information is associated with the keyword in the second target chat information.

8. The electronic device according to claim 7, wherein after the displaying an information label in a target region associated with the second target chat information, the method further comprises:
- receiving a fourth input performed by the user on the information label; and
- jumping, in response to the fourth input, to a chat interface in which S pieces of chat information corresponding to the information type of the second identifier are displayed,
- wherein S is a positive integer.

9. The electronic device according to claim 6, wherein the first target chat information comprises image information, and the image information comprises at least one of picture information or video information; and
- after the jumping to a target chat interface in which the first target chat information is located, the method further comprises:
  - displaying the image information in the first target chat information according to a second preset mode in a case that a quantity of images in the first target chat information is greater than a preset value,
- wherein the second preset mode comprises at least one of a thumbnail mode, a grid mode, or a gallery mode.

10. The electronic device according to claim 6, wherein the displaying M pieces of the chat information that is of the information type indicated by the first identifier comprises:
- displaying the M pieces of chat information corresponding to the information type of the first identifier and topic information associated with the keyword.

11. A non-transitory computer-readable storage medium, storing a computer program, when the computer program is executed by a processor, performs a method for searching for chat information, the method comprising:
- receiving a first input comprising a keyword inputted by a user to search for chat information associated with the keyword, wherein the chat information associated with the keyword fall under N different information types;
- displaying N identifiers indicating the N different information types of the chat information associated with the keyword in response to the first input without displaying the chat information wherein each identifier comprises a user-selectable icon annotated with the corresponding information type, wherein N is a positive integer, and the N information types comprise a picture information type and a video information type;
- in response to receiving a second input selecting a first identifier among the N identifiers from the user, displaying M pieces of the chat information that is of the information type indicated by the first identifier, M being a positive integer;
- receiving a third input performed by the user on first target chat information in the M pieces of chat information;
- jumping to a target chat interface in which the first target chat information is located in response to the third input, wherein the target chat interface comprises the first target chat information; and
- displaying, when the target chat interface further comprises T pieces of chat information corresponding to an information type of a second identifier, the T pieces of chat information according to a first preset mode,
- wherein the second identifier is any identifier other than the first identifier in the N identifiers, T is a positive integer, and the first preset mode comprises at least one of a hiding mode or a thumbnail mode.

* * * * *